(12) United States Patent
Eide

(10) Patent No.: US 7,744,314 B2
(45) Date of Patent: Jun. 29, 2010

(54) CLAMPING DEVICE FOR BUOYANCY BODIES

(76) Inventor: Hallvar Eide, Lande, Orskog (NO) 6240

( * ) Notice: Subject to any disclaimer, the term of this patent is extended or adjusted under 35 U.S.C. 154(b) by 0 days.

(21) Appl. No.: 12/095,206

(22) PCT Filed: Dec. 1, 2006

(86) PCT No.: PCT/NO2006/000453
§ 371 (c)(1),
(2), (4) Date: Jun. 17, 2008

(87) PCT Pub. No.: WO2007/064229
PCT Pub. Date: Jun. 7, 2007

(65) Prior Publication Data
US 2008/0286049 A1    Nov. 20, 2008

(30) Foreign Application Priority Data
Dec. 1, 2005    (NO) .................................. 20055671

(51) Int. Cl.
*E21B 17/01* (2006.01)
(52) U.S. Cl. .................... 405/224.2; 405/171; 405/216; 166/350
(58) Field of Classification Search ................. 405/171, 405/211, 212, 216, 224.2, 224.4; 441/133; 166/350
See application file for complete search history.

(56) References Cited

U.S. PATENT DOCUMENTS

| 1,696,899 | A | * | 1/1929 | Baccovich | ................... 106/738 |
| 4,477,207 | A | | 10/1984 | Johnson | |
| 5,222,453 | A | * | 6/1993 | Chabot | ................... 114/230.22 |
| 5,711,639 | A | | 1/1998 | Tessier et al. | |
| 5,957,074 | A | * | 9/1999 | de Baan et al. | ........ 114/230.12 |
| 6,024,791 | A | * | 2/2000 | Sonoda et al. | ............... 106/714 |
| 6,270,387 | B1 | * | 8/2001 | Nesheim | ..................... 441/133 |

FOREIGN PATENT DOCUMENTS
GB    2286649    8/1995
GB    2288205    10/1995

* cited by examiner

*Primary Examiner*—Frederick L Lagman
(74) *Attorney, Agent, or Firm*—Dennison, Schultz & MacDonald

(57) ABSTRACT

Buoyancy unit for use on a riser for sub sea applications, particularly for great depths, with a clamp 11 to be tensioned around the riser 16, and with a tensioning member 18 to damp the clamp 11. Buoyancy bodies 26, 27 are provided to engage with the clamp 11, said clamp 11 having at least one arched element 12-15 providing an annular structure to enclose the riser and to be pressed thereto with a tensioning strap 18. The buoyancy bodies 26, 27 are attached to the arched segments, The clamp 11 is cast from of a concrete material where at least the outer shell or layer is provided to prevent the intrusion of water, the casting of the clamp preferably containing powdered aplite.

5 Claims, 1 Drawing Sheet

CLAMPING DEVICE FOR BUOYANCY BODIES

BACKGROUND OF THE INVENTION

The invention relates to a clamping device for attaching buoyancy bodies to a riser at offshore petroleum installations.

To reduce the weight of flexible risers in water; buoyancy modules are attached along the tube. Such buoyancy modules are manufactured of a buoyancy material, e.g. epoxy-resin, microglass and larger hollow plastic spheres. Such buoyancy modules typically have a specific weight of 0.35-0.45 and are dimensioned for depths of 500-2000 meters. The size is normally adapted to provide a net buoyancy of 500-2000 kg.

To attach buoyancy modules, clamping devices are coupled to the riser. The buoyancy module is then attached to the clamping device on the riser. The buoyancy is then transferred to the riser via the clamping device. With safety factor considered, such a clamping device should be dimensioned to take an axial load of 5-10 tons.

Such clamp should satisfy several, partly contradicting criterias:
- It should be mechanically stable over a lifespan of 20-25 years
- It should have a certain elasticity to compensate for expansion/contraction of the riser (due to changes in the internal pressure/temperature of the riser)
- It should be applicable to risers with relatively large tolerances in the outer diameter (typically +/−5%)
- The materials should not be influenced by hydrostatic pressure.

This combination of demands is difficult to satisfy.

The coupling between the clamp and the riser is dependant on the surface friction of the contact surface between the clamp and the riser. Due to the structure and the material composition of the riser, a frictional coefficient of only 0.07 between the clamp and the riser is allowed. This requires a relatively high clamping force on the riser to achieve sufficient capacity.

The clamping device is typically manufactured with three-four segments and are clamped with a strap. This strap should be sufficiently flexible to allow for the changes in diameter occurring. The clamping force of the strap may typically be 20-80 tons, depending on the calculated force of the clamp.

Known clamping devices are mainly manufactured of polymeric material. A problem with such material is that the combination of relatively high exploitation of the material and relatively high temperatures will involve plasticity flow. Such flow involves dimensional changes reducing the holding capacity. To solve this problem, the clamping device can be made larger to reduce the tension, but this is undesirable.

From UK patent specification 2288205 (CRP Group 1995) a clamping device with two or more arched gripping elements with pressure elastic surface of contact or rigid gripping elements covered with a pressure elastic layer, is known. It is proposed to manufacture this clamping device of a foam material to provide buoyancy without additional bodies. To fasten this clamping device to the riser, a strap of metal is utilized.

The disadvantage of such a clamping device is the flow and deformation of the polymeric materials due to high tension in combination with high temperature.

From UK patent specification 2286649 (Balmoral 1995) a riser clamp is known, in which two internal substantially semicircular elements with series of annular ribs attached are forced against the riser with a strap of metal or a composite. The buoyancy elements are attached to the ribs.

A disadvantage of such clamping device, are the grooves in the contacting face of the clamp, to increase the desired holding force. Such holding means are not acceptable due to the risk of damaging the riser. Polymer material has been used in the clamping elements, with the risk of flow and deformation.

WO-Publication 2004090348 (Balmoral Group 2004) teaches the use of a shell around the riser and applying tension with a strap, the shell carrying ribs for attaching buoyancy bodies.

A disadvantage when using clamps of polymeric material, is the plasticity flow.

SUMMARY OF THE INVENTION

The main object of the invention is to provide a device for clamping of buoyancy modules to a riser, with improved properties over prior art devices, particularly with regard to the properties of high pressure, high temperature and longevity. A particular object is to provide a device without any loss in mechanical capacity upon increases in temperature.

BRIEF DESCRIPTION OF THE DRAWINGS

More details of the invention are stated in the following description of embodiments.

Example

The invention is illustrated in the drawing, wherein

FIG. 1 shows a perspective view of a clamping device or clamp which may be manufactured according to the invention, and FIG. 2 shows an exploded perspective view of an assembly of a clamp and a buoyancy body with a riser.

DESCRIPTION OF THE PREFERRED EMBODIMENTS

Figure 1:
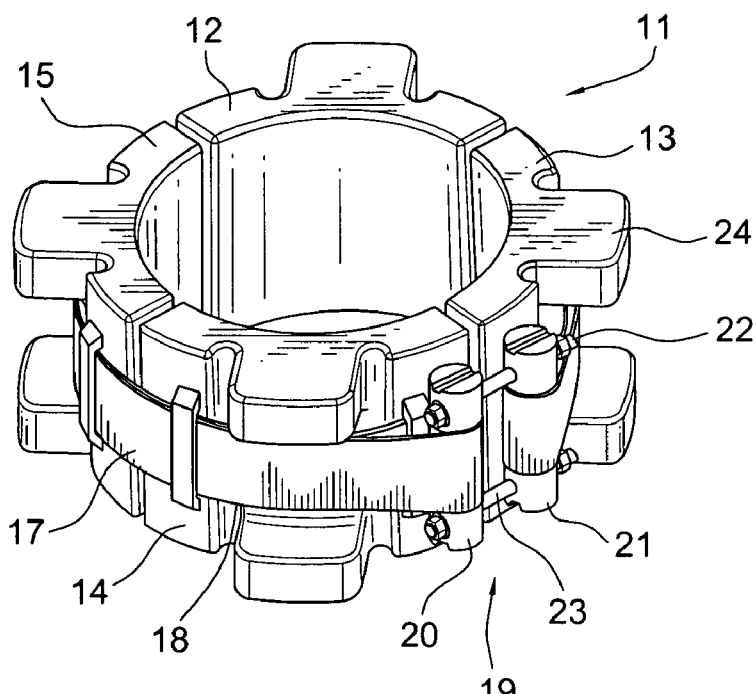
Figure 2:
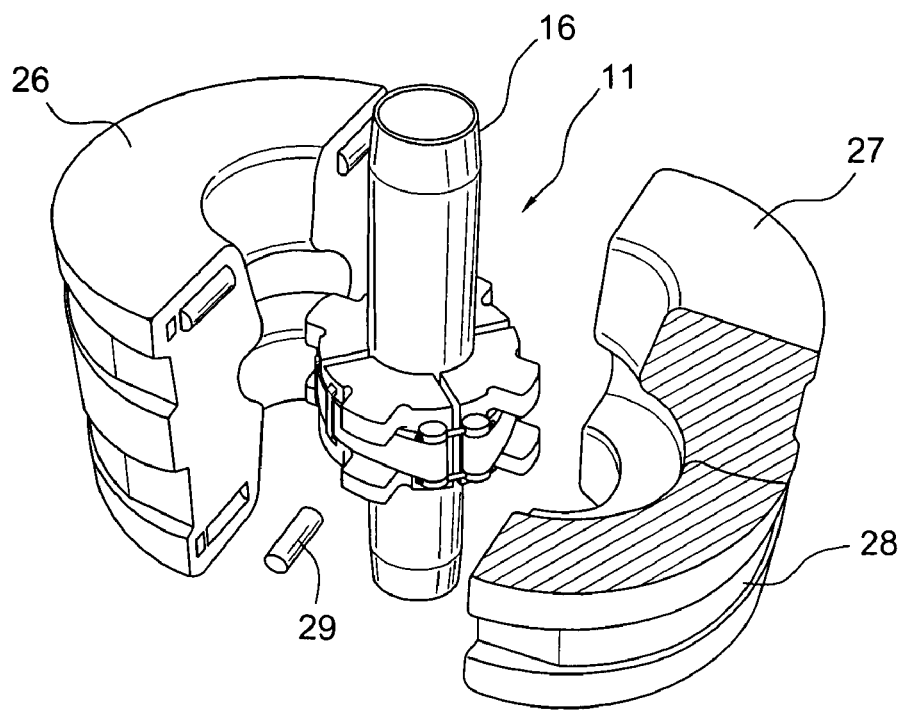

FIG. 1 shows a clamping device 11, in the following called a clamp, comprising four arched segments 12, 13, 14, 15. The arched segments 12-15 provide a sleeve shaped member which can be clamped on a riser 16 as shown in FIG. 2.

Around the arched segments 12-15 is a groove 17 for a tensioning ribbon 18 covering the central part of the clamp 11 and being tensioned with a strap tightener 19 comprising two end posts 20, 21 joined by two tensioning bolts 22, 23. Each arched segment 12-15 has a pair of radial protrusions or lugs 24, 25 at the middle of the arched segment, one on each side of the groove 17.

The arched segments are cast from concrete, i.e. a substantial amount of a cement and base substance and possibly a filler.

It is useful to utilize a concrete which does not absorb water, which may deteriorate the concrete quality over time. In one example, a concrete suitable for the clamp was prepared, from about 30 percent by weight cement, e.g. Rapidcement, about 25 percent by weight of powdered aplite, about 9 percent water and the remainder aplite sand 8/11 grade. The content of powdered aplite may be higher, with a corresponding lower share of cement.

This provided a cured concrete with high compressive strength. Also it provided a non-porous concrete absorbing negligible moisture.

In FIG. 2, the clamp 11 is shown together with a buoyancy body consisting of two cylindrical blocks 26, 27. The tubular blocks 26, 27 have an external circumferential groove 28 for a tensioning ribbon (not shown), Internally, the cylindrical blocks have recesses mating the lugs 24, 25 of the arched segments 12-15.

In the interface between said blocks, a locking element 29 is arranged in a pair of mating grooves to prevent axial displacement.

The buoyancy bodies 26, 27 may be of a foam material according to the prior art. The bodies may be unattached to the clamp. The pair of halves are joined by penetrating bolts or ribbons tightened around the block in a manner known per se. Tensioning gear dimensioned for a tightening force of 2-6 tons will be suitable.

The invention claimed is:

1. Buoyancy unit for use on a riser for sub sea applications, comprising:
    a clamp to be tensioned around the riser, said clamp having at least one arched element providing an annular structure for enclosing the riser,
    a tensioning strap constructed and arranged to clamp the clamp and press the clamp to the riser, and
    buoyancy bodies which engage with the clamp,
    wherein the buoyancy bodies are attached to the at least one arched element, and
    wherein the clamp is cast from a concrete material where at least an outer shell or layer of the clamp is provided to prevent intrusion of water.

2. Buoyancy unit according to claim 1, wherein the claim is cast from a material including powdered aplite.

3. Buoyancy unit according to claim 2, wherein the material includes a minimum of 25% by weight of powdered aplite.

4. Buoyancy unit according to claim 2, wherein the casting material contains about 30% by weight of cement.

5. Buoyancy unit according to claim 2, wherein the casting material contains aplite sand, grade 8/11.

* * * * *